(12) United States Patent
Hamaji et al.

(10) Patent No.: US 6,295,196 B1
(45) Date of Patent: Sep. 25, 2001

(54) MONOLITHIC CERAMIC ELECTRONIC COMPONENT

(75) Inventors: Yukio Hamaji, Otsu; Nobuyuki Wada, Shiga-ken; Tsuyoshi Yamana, Kyoto; Takanori Nakamura, Omihachiman, all of (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/611,101

(22) Filed: Jul. 6, 2000

(30) Foreign Application Priority Data

Jul. 6, 1999 (JP) .................................................. 11-192303

(51) Int. Cl.[7] .............................. H01G 4/06; C04B 35/468
(52) U.S. Cl. .................................... 361/321.2; 361/321.4; 501/137; 501/138
(58) Field of Search ...................... 361/306.3, 311–313, 361/321.2, 321.4; 501/137–139

(56) References Cited

U.S. PATENT DOCUMENTS 4,283,753 * 8/1981 Burn .................................... 361/321.4
6,043,174 * 3/2000 Maher et al. ......................... 501/137
6,205,015 * 3/2001 Wada et al. ......................... 361/321.4

\* cited by examiner

Primary Examiner—Anthony Dinkins
(74) Attorney, Agent, or Firm—Ostrolenk, Faber, Gerb & Soffen

(57) ABSTRACT

A monolithic ceramic electronic component includes a laminate including a plurality of ceramic layers obtained by sintering a ceramic raw material powder, and a plurality of internal electrodes located between the ceramic layers and obtained by sintering a metallic powder. The ceramic layers have a thickness of about 3 $\mu$m or less and are composed of ceramic grains having an average particle diameter of more than about 0.5 $\mu$m, the particle diameter of the ceramic grains in the thickness direction of the ceramic layers is smaller than the thickness of the ceramic layers, and the internal electrodes have a thickness of about 0.2 to 0.7 $\mu$m. Preferably, the monolithic ceramic electronic component further includes an external electrode formed on each of the opposing ends of the laminate, the ceramic layers are composed of a ceramic dielectric material, and each of the plurality of internal electrodes is formed with an edge being exposed to either one of the opposing ends of the laminate so as to be electrically connected to either one of the external electrodes to form a monolithic ceramic capacitor.

17 Claims, 1 Drawing Sheet

MONOLITHIC CERAMIC ELECTRONIC COMPONENT

BACKGROUND OF THE INVENTION

1. Field of the Invention

The present invention relates to monolithic ceramic electronic components, such as a monolithic ceramic capacitor provided with internal electrodes composed of a base metal, for example, nickel or a nickel alloy.

2. Description of the Related Art

Various types of monolithic ceramic electronic components provided with a plurality of ceramic layers and internal electrodes formed between the ceramic layers have been commercially available. A typical example thereof is a monolithic ceramic capacitor in which a ceramic dielectric material is used for the ceramic layers.

Conventionally, a noble metal such as palladium or platinum or an alloy thereof is used for internal electrodes in such a monolithic ceramic capacitor because the dielectric material must be fired in air at a temperature as high as approximately 1,300° C. However, such materials for electrodes are very expensive, resulting in an increase in production cost.

In order to reduce the production cost, the use of base metals as materials for internal electrodes in monolithic ceramic capacitors has been implemented, and various types of nonreducing dielectric materials which can be fired in a neutral or reducing atmosphere in order to prevent the electrodes from oxidizing during firing have been developed. Examples of the base metal used for internal electrodes include cobalt, nickel and copper. In view of cost and oxidation resistance, nickel is predominantly used.

There is now a demand for further reduction in size and larger capacitance with respect to monolithic ceramic capacitors, and an increase in dielectric constant and a decrease in thickness have been studied with respect to ceramic dielectric materials, and simultaneously, a decrease in thickness has been studied with respect to materials for electrodes.

In general, internal electrodes of monolithic ceramic capacitors are formed by a printing method, such as screen-printing, using a paste containing a metallic powder. When nickel powder is used as the metallic powder to be incorporated in such a paste, a nickel powder having an average particle diameter of more than 0.25 $\mu$m, which is produced by a liquid phase method or a chemical vapor method, is used in many cases. However, with such a large particle size, it is difficult to decrease the thickness of internal electrodes.

When a nickel powder having an average particle diameter as large as 0.25 $\mu$m is used, in order to make the dielectric ceramic exhibit dielectric properties, the thickness of the electrodes must be set at 0.8 $\mu$m or more.

Although a decrease in the thickness of the ceramic dielectric layer is the most effective means to increase the capacitance of the monolithic ceramic capacitor, for example, if the thickness of the ceramic layer is 3 $\mu$m or less against the thickness of 0.8 $\mu$m of the internal electrode, delamination, which is a fatal structural defect in the monolithic capacitor, frequently occurs due to a difference in shrinkage factor between the electrode and the ceramic.

With respect to high dielectric constant type monolithic ceramic capacitors satisfying F-level and E-level characteristics and temperature-compensating type monolithic ceramic capacitors satisfying SL-level and CG-level characteristics stipulated in the Japanese Industrial Standard (JIS), if the thickness of the ceramic layer is as thin as 3 Mm or less, the electrical characteristics may degrade, resulting in difficulty in obtaining a high-performance monolithic ceramic capacitor.

SUMMARY OF THE INVENTION

Accordingly, it is an object of the present invention to provide a monolithic ceramic electronic component, such as a monolithic ceramic capacitor, in which the thickness of inner electrodes and ceramic layers can be decreased without the occurrence of structural defects, enabling miniaturization and high reliability.

A monolithic ceramic electronic component in accordance with the present invention includes a laminate including a plurality of ceramic layers obtained by sintering a ceramic raw material powder, and a plurality of internal electrodes located between the ceramic layers and obtained by sintering a metallic powder. The ceramic layers have a thickness of about 3 $\mu$m or less and contain ceramic grains having an average particle diameter of more than about 0.5 $\mu$m. The particle diameter of the ceramic grains in the thickness direction of the ceramic layers is smaller than the thickness of the ceramic layers. The internal electrodes have a thickness of about 0.2 to 0.7 $\mu$m.

Preferably, the monolithic ceramic electronic component further includes an external electrode formed on each of the opposing ends of the laminate, the ceramic layers are composed of a ceramic dielectric material, and each of the plurality of internal electrodes is formed with an edge being exposed to either one of the opposing ends of the laminate so as to be electrically connected to either one of the external electrodes to form a monolithic ceramic capacitor.

Preferably, the internal electrodes are formed of a paste containing the metallic powder, and the metallic powder in the paste has an average particle diameter of about 10 to 200 nm.

Preferably, the metallic powder is composed of a base metal, and the base metal preferably contains nickel.

Preferably, the internal electrodes are formed by a method including a step of applying the paste containing the metallic powder by a printing method.

Preferably, the ceramic raw material powder before sintering has an average particle diameter of about 25 to 250 nm.

Preferably, each of the ceramic grains constituting the ceramic layers has a uniform composition and a uniform crystal system, and the individual ceramic grains have the same composition and the same crystal system.

Preferably, each of the ceramic grains constituting the ceramic layers has a uniform composition and a uniform crystal system, and the ceramic layers are composed of at least 2 types of ceramic grains having different compositions.

DESCRIPTION OF THE PREFERRED EMBODIMENTS

Figure 1:
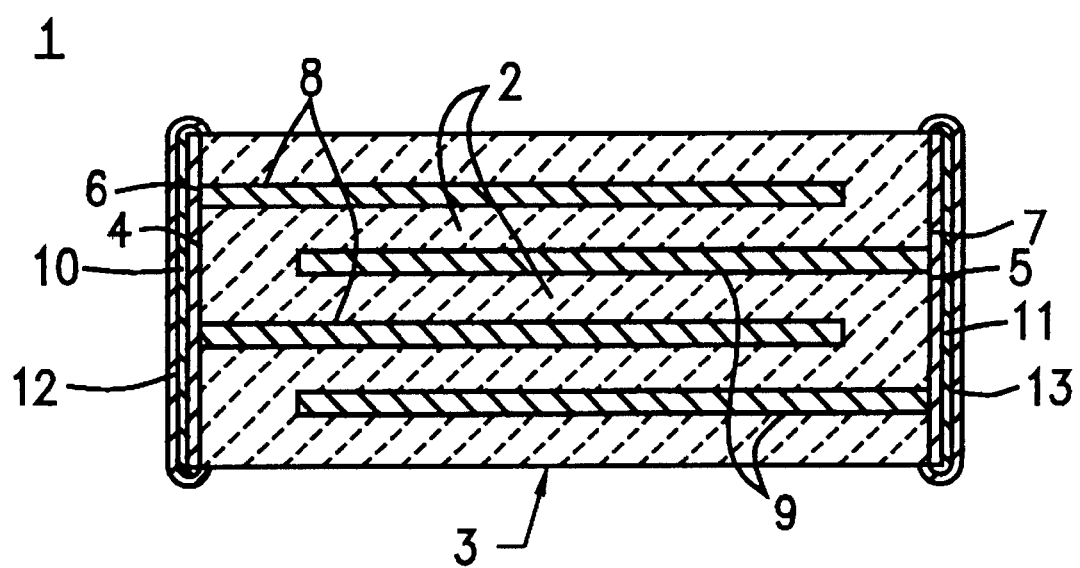
FIG. 1 is a sectional view showing a monolithic ceramic capacitor in accordance with an embodiment of the present invention.

An embodiment of the present invention will be described, which is applied to a monolithic ceramic capacitor 1 having the structure shown in FIG. 1.

The monolithic ceramic capacitor 1 includes a laminate 3 including a plurality of ceramic layers 2 composed of a ceramic dielectric material which are laminated, and first and second external electrodes 6 and 7 which are provided on first and second ends 4 and 5, respectively. The monolithic ceramic capacitor 1 constitutes a chip-type monolithic ceramic electronic component in a rectangular parallelepiped shape.

First internal electrodes 8 and second internal electrodes 9 are alternately placed in the laminate 3. The first internal electrodes 8 are formed at a plurality of specific interfaces between the ceramic layers 2 with an edge being exposed to the first end 4 so as to be electrically connected to the first external electrode 6. The second internal electrodes 9 are formed at a plurality of specific interfaces between the ceramic layers 2 with an edge being exposed to the second end 5 so as to be electrically connected to the second external electrode 7.

In order to fabricate the monolithic ceramic capacitor 1, a principal raw material such as barium titanate, i.e., a ceramic raw material powder, and additives for improving characteristics, etc., are prepared as starting materials,. Preferably, for the reason described below, the ceramic raw material powder to be used has an average particle diameter of about 25 to 250 nm, for example, by adjusting the calcining temperature or by employing wet synthesis. The ceramic raw material powder is produced by wet-mixing oxides or carboxides, which is known as a solid-phase method, or by wet synthesis, which is known as hydrothermal synthesis or hydrolysis, so as to satisfy a predetermined composition, followed by drying and calcining.

Predetermined amounts of the raw material powder and the additives are weighed, and a mixed powder is formed by wet mixing. More specifically, the individual additives are mixed to the ceramic raw material powder in the form of oxide powders or carboxide powders, followed by wet mixing. At this stage, in order to make the individual additives soluble in a solvent, alkoxides or compounds such as acetylacetates or metallic soaps may be formed. Alternatively, a solution containing the individual additives may be applied to the surface of the ceramic raw material powder, followed by heat treatment.

Next, a ceramic slurry is prepared by adding an organic binder and a solvent to the mixed powder. Ceramic green sheets for forming the dielectric ceramic layers 2 are formed by using the ceramic slurry. The thickness of the green sheets is set so that the thickness after firing is about 3 $\mu$m or less for the reason described below.

Conductive paste films for forming internal electrodes 8 and 9 are then formed on the specific ceramic green sheets by a printing method, such as screen-printing. The thickness of the conductive paste films is set so that the thickness after firing ranges from about 0.2 to 0.7 $\mu$m.

A paste constituting the conductive paste films contains a metallic powder, a binder and a solvent. The metallic powder preferably has an average particle diameter of about 10 to 200 nm for the reason described below. For example, a paste containing a nickel powder, an ethyl cellulose binder and a solvent, such as triphenol, may be used. The paste is elaborately prepared by a three-roller mill or the like so that the aggregation of the nickel powder having a very small average particle diameter of about 10 to 200 nm is loosened or avoided and the nickel powder is satisfactorily dispersed.

The metallic powder, more specifically, the nickel powder, may be advantageously produced, for example, by a chemical vapor method, a hydrogen arc discharge method, or a gas evaporation method.

In the chemical vapor method, nickel chloride is vaporized by heating, and the resulting nickel chloride vapor is brought into contact with hydrogen at a predetermined temperature while being transported by an inert gas, thus causing a reaction to produce a nickel powder. The nickel powder is recovered by cooling the reactant gas containing the nickel powder.

In the hydrogen arc discharge method, arc discharge is performed in an atmosphere containing hydrogen gas to melt and vaporize nickel, and thus a fine nickel powder is produced from the vapor phase. By dissolving supersaturated hydrogen in molten nickel by means of arc or plasma heat, a high-temperature state locally occurs when hydrogen is released from the molten nickel, and the evaporation of nickel is accelerated, and thus a nickel vapor is released. By condensing and cooling the nickel vapor, the fine nickel powder is produced.

In the gas evaporation method, a nickel ingot is melted in a vessel filled with an inert gas, such as Ar, He or Xe, by heating means, such as high-frequency induction heating, so that a nickel vapor is produced. The resulting nickel vapor is cooled and solidified by being brought into contact with the inert gas in the atmosphere, and thus the fine nickel powder is produced.

Next, a plurality of ceramic green sheets including the ceramic green sheets provided with the conductive paste films as described above are laminated and pressed, followed by cutting as required. In this way, a green laminate 3 is fabricated, in which the plurality of ceramic green sheets and the conductive paste films for forming the plurality of internal electrodes 8 and 9 located between the ceramic green sheets are laminated, and an edge of each conductive paste film for forming the internal electrode 8 or 9 is exposed to the end 4 or 5, respectively.

Next, the laminate 3 is fired in a reducing atmosphere. At this stage, for the reason described below, the firing conditions are set so that ceramic grains constituting the ceramic layers 2 after firing have an average particle diameter of more than about 0.5 $\mu$m.

The first and second external electrodes 6 and 7 are formed on the first and second ends 4 and 5 of the laminate 3, respectively, so as to be electrically connected to the exposed edges of the first and second internal electrodes 8 and 9.

The material composition of the external electrodes 6 and 7 is not particularly limited. Specifically, the same material as that for the internal electrodes 8 and 9 may be used. Alternatively, a sintered layer composed of a conductive metallic powder, such as Ag, Pd, Ag—Pd, Cu or a Cu alloy, or a sintered layer composed of the conductive metallic powder added with glass frit, such as $B_2O_3$—$Li_2O$—$SiO_2$—BaO-based glass, $B_2O_3$—$SiO_2$—BaO-based glass, $Li_2O$—$SiO_2$—BaO-based glass or $B_2O_3$—$SiO_2$—ZnO-based glass, may be used. An appropriate material is selected depending on the intended application of the monolithic ceramic capacitor 1, the operating environment of the monolithic ceramic capacitor 1, etc.

Additionally, the external electrodes 6 and 7 may be formed by applying a metallic powder paste to the fired laminate 3 followed by baking, or may be formed by applying the metallic powder paste to the green laminate 3 and by firing simultaneously with the laminate 3.

As required, the external electrodes 6 and 7 are coated with plating layers 10 and 11 composed of Ni, Cu, a Ni—Cu alloy or the like, respectively. Furthermore, second plating layers 12 and 13 composed of solder, tin or the like may be formed on the plating layers 10 and 11, respectively.

With respect to the thickness of the internal electrodes 8 and 9 in the present invention, and with respect to the average particle diameters of the Ni powder contained in the paste used for forming the internal electrodes 8 and 9, the ceramic raw material powder before sintering for forming the ceramic layers 2, and the ceramic grains constituting the ceramic layers, and to the thickness of the ceramic layers 2 in the embodiment of the present invention, the ranges described above are defined. Herein, the "average particle diameter" means a diameter of particles ($D_{50}$) corresponding to 50% particles in the number-size distribution obtained by analyzing electron micrographs of the powders and the ceramic grains.

In the present invention, the reason for setting the thickness of the internal electrodes 8 and 9 at about 0.7 $\mu$m or less is that if the thickness exceeds about 0.7 $\mu$m, when the thickness of the ceramic layer 2 is as thin as about 3 $\mu$m or less, delamination due to a difference in shrinkage factors between the internal electrodes 8 and 9 containing nickel and the ceramic layers 2 inevitably occurs. In other words, by setting the thickness of the internal electrodes 8 and 9 at about 0.7 $\mu$m or less, the thickness of the ceramic layers 2 can be reduced to about 3 $\mu$m or less without any problems, thus enabling miniaturization and an increase in capacitance of the monolithic ceramic capacitor 1.

On the other hand, the thickness of the internal electrodes 8 and 9 is set at about 0.2 $\mu$m or more because, if the thickness is less than about 0.2 $\mu$m, nickel contained in the internal electrodes 8 and 9 reacts with the ceramic contained in the ceramic layers 2 during firing, resulting in oxidation of nickel or delamination due to the oxidation, and the function as the internal electrodes may be lost.

The reasons for setting the average particle diameter of the ceramic grains of the ceramic dielectric material at more than about 0.5 $\mu$m and for defining that the particle diameter of the ceramic grains in the thickness direction of the ceramic layers be smaller than the thickness of the ceramic layers are as follows.

That is, when the thickness of the ceramic layers is set at about 3 $\mu$m or less, if the average particle diameter of the ceramic grains is about 0.5 $\mu$m or less, the dielectric properties of the ceramic are degraded due to thermal stress resulting from a difference in thermal shrinkage factors between the internal electrode layers and the ceramic layers during firing and cooling of the monolithic ceramic capacitor. When the average particle diameter of the ceramic is set at more than about 0.5 $\mu$m by appropriately selecting the firing temperature and the ceramic composition, the dielectric properties of the ceramic layers improve, thus enabling miniaturization and an increase in capacitance of the monolithic ceramic capacitor.

If the particle diameter of the ceramic grains exceeds the thickness of the ceramic layers, delamination occurs due to firing, which is disadvantageous. However, when the particle diameter of the ceramic grains in the thickness direction of the ceramic layer is not larger than the thickness of the ceramic layers, even if the particle diameter of the ceramic grains in the longitudinal direction of the ceramic layers is equal to or larger than the thickness of the ceramic layers, no problem arises with respect to the properties.

In the case of the high-dielectric-constant type monolithic ceramic capacitors satisfying the F-level and E-level characteristics stipulated in JIS, preferably, each of the ceramic grains constituting the ceramic layers has a uniform composition and a uniform crystal system, and the individual ceramic grains have the same composition and the same crystal system. Thereby, the dielectric constant of the ceramic layers is increased and a monolithic ceramic capacitor with high reliability can be obtained.

In the case of the temperature-compensating type monolithic ceramic capacitors satisfying the SL-level and CG-level characteristics stipulated in JIS, preferably, each of the ceramic grains constituting the ceramic layers has a uniform composition and a uniform crystal system, and the ceramic layers are composed of at least 2 types of ceramic grains having different compositions. Thereby, the Q factor of the ceramic layers is increased, and the dielectric constant-temperature characteristics become planar.

The reason for setting the average particle diameter of the Ni powder used for the internal electrodes, preferably, at about 10 to 200 nm is as follows.

When the average particle diameter of the Ni powder is less than about 10 nm, it is difficult to produce a paste with a viscosity that is applicable to a printing method, such as screen-printing. Even if screen-printing is performed using a paste having such a high viscosity, it is difficult to form planar conductive paste films for forming the internal electrodes 8 and 9 because of high viscosity, and thin spots and pinholes occur, resulting in a decrease in coverage and electrode disconnection.

On the other hand, when the average particle diameter of the Ni powder exceeds about 200 nm, since the nickel particles are excessively large, it is difficult to form planar conductive paste films for forming the internal electrodes 8 and 9, resulting in a decrease in coverage. The unevenness at the interfaces between the internal electrodes 8 and 9 and the ceramic layers 2 also increases.

The reason for setting the average particle diameter of the ceramic raw material powder for forming the ceramic device, preferably, in the range from about 25 to 250 nm is as follows.

That is, when the average particle diameter of the ceramic raw material powder is set at less than about 25 nm, the ceramic raw material powder tends to aggregate, resulting in a difficulty in obtaining a uniform green sheet, and when the thickness of the device is set at about 3.0 $\mu$m, short-circuiting easily occur. On the other hand, when the average particle diameter of the ceramic raw material powder exceeds about 250 nm, the evenness of the surface of the green sheet is deteriorated, resulting in an increase in unevenness at the interfaces between the internal electrodes 8 and 9 and the ceramic layers 2.

Although the monolithic ceramic capacitor has been described in the above embodiment as the monolithic ceramic electronic component, the present invention is also applicable to other monolithic ceramic electronic components including substantially the same structure, such as multilayered ceramic substrates.

With respect to the metallic powder contained in the paste for forming the internal electrodes, in addition to the nickel powder described above, a powder of a nickel alloy, a powder of other base metals, such as copper or a copper alloy, or a powder of a noble metal may be used.

The present invention will be described below in detail based on the examples. However, it is to be understood that the invention is not limited to those examples.

EXAMPLE 1

Monolithic ceramic capacitors having the structure as shown in FIG. 1 were fabricated in this example.

1. Fabrication of Samples

First, as ceramic raw material powders, (Ba, Sr)TiO$_3$ powders having different average particle diameters shown in Table 1 were produced by hydrolysis. Table 2 shows the composition of the ceramics containing the powders shown in Table 1 as principal raw materials used in the example. With respect to the additives, a solution containing the additive components was applied to the surfaces of the (Ba, Sr)TiO$_3$ powders, and heat treatment was performed at 500° C. In this case, in order to make the additives soluble in an organic solvent, alkoxides were formed, and also compounds such as acetylacetates or metallic soaps were formed. The ceramic raw material powders having the desired composition shown in Table 2 were then calcined, and by adjusting the calcining temperature, the ceramic raw materials having the average particle diameters of 15 nm, 25 nm, 200 nm, and 300 nm were prepared as shown in Table 3.

TABLE 1

| Ba$_{0.7}$Sr$_{0.3}$TiO$_3$ Powder Type | Average Particle Diameter D50 (nm) |
|---|---|
| A | 15 |
| B | 25 |
| C | 50 |

TABLE 2

| | Composition (mole parts) |
|---|---|
| Ba$_{0.7}$Sr$_{0.3}$TiO$_3$ | 100 |
| MgO | 1.0 |
| MnO | 0.5 |
| SiO$_2$ | 1.0 |

TABLE 3

| Raw Material No. | Ba$_{0.7}$Sr$_{0.3}$TiO$_3$ Powder Type | Calcining Temperature (° C.) | Average Particle Diameter D50 (nm) |
|---|---|---|---|
| 1 | A | 600 | 15 |
| 2 | B | 700 | 25 |
| 3 | C | 950 | 200 |
| 4 | C | 1050 | 300 |

Next, a polyvinyl butyral-based binder and an organic solvent, such as ethanol, were added to the individual barium titanate-based ceramic raw material powders shown in Table 3, followed by wet mixing using a ball mill, to prepare ceramic slurries. The ceramic slurries were formed into sheets by a doctor blade process. By adjusting the slit width of the doctor blade, ceramic green sheets having thicknesses of 4.2 μm and 1.4 μm were formed. The individual thicknesses of 4.2 μm and 1.4 μm corresponded to the thicknesses of 3 μm and 1 μm of the ceramic layers after lamination and firing, respectively, as is obvious from the evaluation results described below.

In the meantime, spherical Ni powders having average particle diameters of 5 nm, 15 nm, 50 nm, 100 nm, 180 nm and 250 nm were produced. More specifically, the Ni powders having the average particle diameters of 5 nm and 15 nm were produced by the gas evaporation method, the Ni powders having the average particle diameters of 50 nm and 100 nm were produced by the hydrogen arc discharge method, and the Ni powders having the average particle diameters of 180 nm and 250 nm were produced by the chemical vapor method.

Next, 42% by weight of each Ni powder was combined with 44% by weight of an organic vehicle, which was produced by dissolving 6% by weight of an ethyl cellulose-based binder in 94% by weight of triphenol, and 14% by weight of triphenol, and dispersion and mixing treatment was performed using a three-roller mill to prepare a paste containing the Ni powder satisfactorily dispersed.

Next, the resultant Ni pastes were screen-printed on the individual ceramic green sheets to form conductive paste films for forming internal electrodes. At this stage, by adjusting the thickness of the screen pattern, samples provided with the conductive paste films having thicknesses of 1.2 μm, 1.0 μm, 0.6 μm, 0.3 μm and 0.15 μm were fabricated. The individual thicknesses of 1.2 μm 1.0 μm, 0.6 μm, 0.3 μm, and 0.15 μm of the conductive paste films after drying corresponded to the individual thicknesses of 0.8 μm, 0.7 μm, 0.4 μm, 0.2 μm and 0.1 μm of the internal electrodes after lamination and firing, as is obvious from the evaluation results described below.

Next, a plurality of ceramic green sheets were laminated in such a manner that the edges at which the conductive paste layers were exposed alternately faced different ends of the laminate to be formed, followed by heat pressing for consolidation. The pressed structure was cut into pieces with a predetermined size, and green chips as green laminates were obtained. The green chips were heated at 300° C. in a nitrogen atmosphere, and after the binder was removed, firing was performed for 2 hours at a firing temperature in the range from 1,000° C. to 1,200° C. shown in Table 4 in a reducing atmosphere comprising gases of H$_2$, N$_2$ and H$_2$O having an oxygen partial pressure of $10^{-9}$ to $10^{-12}$ MPa.

A silver paste containing B$_2$O$_3$—Li$_2$O—SiO$_2$—BaO-based glass frit was applied to both ends of each sintered ceramic laminate, and baking was performed at 600° C. in a nitrogen atmosphere, and thus external electrodes which were electrically connected to the internal electrodes were formed.

In the individual samples, monolithic ceramic capacitors obtained as described above had outer dimensions in which the width was 5.0 mm, the length was 5.7 mm and the thickness was 2.4 mm, and the ceramic layers interposed between the internal electrodes had a thickness of 3 μm or 1 μm. The total number of the effective ceramic dielectric layers was 5 and the area of the counter electrode per one layer was $16.3 \times 10^{-6}$ m$^2$.

2. Evaluation of Samples

Next, with respect to the samples of the monolithic ceramic capacitors, the laminated structure, electrical characteristics and reliability were evaluated. The results thereof are shown in Table 4. The asterisked sample numbers indicate that the samples were out of the scope of the present invention.

In order to measure the average particle diameter of the dielectric ceramic contained in each of the monolithic ceramic capacitors, the ground surface of the cross section of the monolithic ceramic capacitor was subjected to chemical etching and observations were carried out using a scanning electron microscope.

In order to measure the thicknesses of the internal electrode layers and the ceramic dielectric layers, the ground surface of the cross section of the monolithic ceramic capacitor was observed by a scanning electron microscope.

With respect to the delamination in the monolithic ceramic capacitor, the cross section of each test piece was ground and judgment was made visually by microscope observation. The rate of test pieces in which delamination occurred to the total number of test pieces in each sample was calculated.

In order to measure the coverage, the internal electrodes of the sample monolithic capacitors were peeled off, and photomicrographs of the states in which the surfaces of the electrodes had holes were taken, followed by image analysis for quantification.

With respect to the samples which were judged satisfactory in the structural evaluation described above, the electrical characteristics described below were evaluated.

The capacitance (C) and the dielectric loss (tan δ) were measured using an automatic bridge-type meter in accordance with JIS C 5102, and the relative dielectric constant ($\epsilon$) was computed based on the capacitance measured.

In the high-temperature load test, while a DC field of 10 kV/mm was being applied at 150° C., the change in insulation resistance with time was measured for each test piece, and the point at which the insulation resistance (R) reached $10^5 \Omega$ or less was defined as failure. The average life to reach failure was computed.

ceramic grains was decreased, the dielectric constant was significantly lower than that of the above, and reliability was also decreased. It has been confirmed that in a thin layer with a device thickness of about 3 μm or less, when the particle diameter of ceramic grains is decreased, electrical characteristics are degraded.

In the sample No. A5, the average particle diameter of ceramic grains constituting the ceramic layers was larger than the thickness of the ceramic layers, and delamination occurred with a high percentage. In contrast, in the sample No. A8, the average particle diameter of ceramic grains constituting the ceramic layers was 3 μm in the thickness direction of the ceramic layers, which was the same as the thickness of the ceramic layers, and the average particle diameter of ceramic grains in the longitudinal direction was 5 μm. As is shown in the sample No. A8, even when the

TABLE 4

| | Monolithic Capacitor Structure | | | Material Characteristics | | | Monolithic | Evaluation of Laminated | | Evaluation of Electrical Characteristics | | |
|---|---|---|---|---|---|---|---|---|---|---|---|---|
| | | | Grain | Ni | Ceramic Raw Material Powder | | Ceramic | | | | | |
| | | | Average | Average | | Average | Capacitor | | | | | |
| | Device | Electrode | Particle | Particle | Raw | Particle | Firing | Structure | | | | Average |
| Sample No. | Thickness (μm) | Thickness (μm) | Diameter (μm) | Diameter (nm) | Material No. | Diameter (nm) | Temperature (° C.) | Delamination (%) | Coverage (%) | $\epsilon$ | tan δ (%) | Life (hour) |
| *A1 | 3 | 0.8 | 3.0 | 250 | 4 | 300 | 1200 | 75 | 68 | — | — | — |
| *A2 | 3 | 0.8 | 1.5 | 180 | 3 | 200 | 1170 | 80 | 72 | — | — | — |
| *A3 | 3 | 0.8 | 3.0 | 50 | 2 | 25 | 1100 | 45 | 85 | — | — | — |
| *A4 | 3 | 0.8 | 1.5 | 15 | 1 | 15 | 1050 | 55 | 92 | — | — | — |
| *A5 | 3 | 0.7 | 4.0 | 250 | 2 | 25 | 1200 | 48 | 75 | — | — | — |
| A6 | 3 | 0.7 | 1.5 | 180 | 3 | 200 | 1170 | 0 | 80 | 17800 | 4.6 | 45 |
| A7 | 3 | 0.7 | 0.7 | 50 | 2 | 25 | 1100 | 0 | 95 | 12470 | 3.7 | 88 |
| A8 | 3 | 0.4 | 5.0 (3.0) | 50 | 2 | 25 | 1200 | 0 | 88 | 18630 | 4.6 | 92 |
| A9 | 3 | 0.4 | 1.7 | 15 | 2 | 25 | 1100 | 0 | 94 | 14350 | 4.7 | 88 |
| A10 | 3 | 0.2 | 0.7 | 100 | 3 | 200 | 1170 | 0 | 73 | 13270 | 4.3 | 48 |
| A11 | 3 | 0.2 | 0.7 | 15 | 2 | 25 | 1100 | 0 | 95 | 13320 | 3.8 | 95 |
| A12 | 3 | 0.2 | 0.7 | 50 | 4 | 300 | 1200 | 0 | 74 | 12650 | 3.6 | 22 |
| A13 | 3 | 0.2 | 0.7 | 5 | 1 | 15 | 1050 | 10 | 67 | 9730 | 2.7 | 98 |
| A14 | 3 | 0.4 | 3.0 | 100 | 1 | 15 | 1050 | 5 | 96 | 19820 | 4.8 | 95 |
| *A15 | 3 | 0.4 | 0.4 | 50 | 2 | 25 | 1050 | 0 | 97 | 5650 | 1.9 | 3 |
| *A16 | 3 | 0.4 | 0.2 | 50 | 2 | 25 | 1000 | 0 | 97 | 3470 | 1.2 | 1 |
| *A17 | 3 | 0.1 | 1.5 | 50 | 3 | 200 | 1170 | 80 | 65 | — | — | — |
| *A18 | 3 | 0.1 | 0.4 | 15 | 2 | 25 | 1100 | 90 | 78 | — | — | — |
| *A19 | 1 | 0.8 | 1.0 | 250 | 2 | 25 | 1100 | 100 | 84 | — | — | — |
| *A20 | 1 | 0.7 | 0.4 | 100 | 2 | 25 | 1050 | 0 | 86 | 4430 | 1.7 | 2 |
| A21 | 1 | 0.7 | 1.0 | 250 | 2 | 25 | 1100 | 0 | 65 | 14330 | 4.5 | 27 |
| A22 | 1 | 0.7 | 0.6 | 180 | 1 | 15 | 1050 | 5 | 73 | 12560 | 4.6 | 33 |
| A23 | 1 | 0.7 | 0.6 | 100 | 3 | 200 | 1170 | 0 | 86 | 13150 | 3.3 | 26 |
| A24 | 1 | 0.4 | 1.0 | 15 | 2 | 25 | 1100 | 0 | 94 | 14620 | 4.7 | 48 |
| A25 | 1 | 0.2 | 1.0 | 50 | 4 | 300 | 1200 | 0 | 63 | 9310 | 3.9 | 16 |
| *A26 | 1 | 0.1 | 1.0 | 15 | 2 | 25 | 1100 | 100 | 91 | — | — | — |
| *A27 | 1 | 0.1 | 0.6 | 5 | 2 | 25 | 1100 | 100 | 66 | — | — | — |

As shown in Table 4 the thickness of the internal electrodes was 0.8 μm and delamination occurred at a high rate with respect to the asterisked sample Nos. A1 to A4 and A19. With respect to the asterisked sample Nos. A17, A18, A26, and A27, the thickness of the internal electrodes was 0.1 μm and delamination also occurred at a high rate. The delamination in the latter was caused by oxidation of nickel.

In contrast, with respect to the sample Nos. A6 to A16 and A20 to A25 in which the thickness of the internal electrodes was in the range from 0.2 to 0.7 μm, delamination did not occur or did not substantially occur.

With respect to the asterisked sample Nos. A15, A16, and A20, the average particle diameter of ceramic grains was about 0.5 μm or less. When the average particle diameter of particle diameter of ceramic grains of the ceramic layers in the longitudinal direction was large, if the particle diameter of ceramic grains in the thickness direction of the ceramic layers is not more than the thickness of the ceramic layers, delamination does not occur and electrical characteristics are not degraded.

As is obvious from the results described above, when the ceramic layers have a thickness of about 3 μm or less, if the internal electrodes have a thickness of about 0.2 to 0.7 μm, the average particle diameter of ceramic grains exceeds about 0.5 μm, and the particle diameter of ceramic grains in the thickness direction of the ceramic layers is smaller than the thickness of the ceramic layers, delamination is prevented and superior electrical characteristics are exhibited.

Next, characteristics of the nickel powder, in particular, the average particle diameter, that can set the thickness of the internal electrodes at about 0.2 to 0.7 μm without any problems, will be described. In the sample No. A21, the average particle diameter of the nickel powder was 250 nm, the coverage was decreased and reliability was decreased. In the sample No. A13, the average particle diameter of the nickel powder was 5 nm, the coverage was decreased and delamination occurred slightly.

In contrast, in the sample Nos. A6 to A12 and A22 to A25, by setting the average particle diameter of the nickel powder in the range from about 10 to 200 nm, a decrease in coverage was reduced and superior reliability was obtained.

Next, the average particle diameter of the ceramic raw material powder for forming the ceramic layers before firing will be described. In the sample Nos. A12 and A25, the average particle diameter of the ceramic raw material powder was 300 nm and the coverage as well as reliability was decreased. In the sample Nos. A13, A14, and A22, the average particle diameter of the ceramic raw material powder was 15 nm and delamination was slightly observed.

In contrast, in the sample Nos. A6 to A11, A23, and A24, by setting the average particle diameter of the ceramic raw material powder in the range from about 25 to 250 nm, no delamination occurred and superior dielectric properties were exhibited.

Furthermore, the ceramic grains constituting the ceramic layers of the monolithic ceramic capacitors were observed by a transmission electron microscope, and analysis was carried out. The ceramic constituting the ceramic layers was pulverized and X-ray powder diffraction analysis was carried out. The resultant diffraction patterns were analyzed by the Rietveld method and the crystalline phase was identified. As a result, it was confined that each of the ceramic grains had a uniform composition and a uniform crystal system, and the individual ceramic grains had the same composition and the same crystal system.

EXAMPLE 2

First, as ceramic raw material powders, the barium titanate-based raw material composition shown in Table 5 was prepared by wet synthesis. That is, solutions of $BaCl_2$, $SrCl_2$, $CaCl_2$, $MgCl_2$ and $CeCl_3$ were mixed, sodium carbonate ($Na_2CO_3$) was added thereto to adjust the pH, and $BaCO_3$, $SrCO_3$, $CaCO_3$, $MgCO_3$ and $Ce_2(CO_3)_3$ were precipitated. Solutions of $TiCl_4$ and $ZrOCl_2 \cdot 8H_2O$ were mixed, 30% aqueous hydrogen peroxide as a stabilizer was added thereto, and sodium hydroxide (NaOH) was further added thereto to adjust the pH. A precipitate containing Ti and Zr was obtained. Slurries of the individual precipitates were thoroughly mixed, and washing and dewatering were performed. By drying the resulting slurry at 110° C., a dried raw material was obtained. The dried raw material was calcined at 700° C. and at 1,100° C., and raw material powders having average particle diameters of 100 nm and 400 nm shown in Table 6 were prepared.

TABLE 5

| (Ba, Sr, Ca, Mg, Ce)(Ti, Zr)$O_3$ + 0.5 mol % $MnO_2$ | |
|---|---|
| Component | Molar ratio |
| Ba | 0.875 |
| Sr | 0.050 |
| Ca | 0.050 |
| Mg | 0.020 |
| Ce | 0.015 |
| Ti | 0.950 |
| Zr | 0.050 |

TABLE 6

| Raw Material No. | Calcining Temperature (° C.) | Average Particle Diameter D50 (nm) |
|---|---|---|
| 5 | 700 | 100 |
| 6 | 1100 | 400 |

Next, in a manner similar to that in example 1, ceramic green sheets having thicknesses of 4.2 μm and 1.4 μm were formed. The individual thicknesses of 4.2 μm and 1.4 μm corresponded to the thicknesses of 3 μm and 1 μm of the ceramic layers after firing, respectively.

Ni pastes were then produced in a manner similar to that in example 1, and the resultant Ni pastes were screen-printed on the ceramic green sheets to form conductive paste films with thicknesses of 1.2 μm, 1.0 μm, 0.6 μm, 0.3 μm and 0.15 μm. The individual thicknesses of 1.2 μm, 1.0 μm, 0.6 μm, 0.3 gm and 0.15 gum corresponded to the individual thicknesses of 0.8 μm, 0.7 μm, 0.4 μm, 0.2 μm and 0.1 μm of the internal electrodes after firing.

Next, in a manner similar to that in example 1, monolithic ceramic capacitors were fabricated and evaluated. The results thereof are shown in Table 7. The asterisked sample numbers in Table 7 indicate that the samples were out of the scope of the present invention.

TABLE 7

| | Monolithic Ceramic Capacitor | | | Material Characteristics | | | | Evaluation of Laminated Structure | | Evaluation of Electrical Characteristics | | |
|---|---|---|---|---|---|---|---|---|---|---|---|---|
| | | | Grain | Ni | Ceramic Raw Material Powder | | Monolithic Capacitor | | | | | |
| | Device | Electrode | Average Particle | Average Particle | Raw | Average Particle | Firing | | | | | Average |
| Sample No. | Thickness (μm) | Thickness (μm) | Diameter (μm) | Diameter (nm) | Material No. | Diameter (nm) | Temperature (° C.) | Delamination (%) | Coverage (%) | ε | tan δ (%) | Life (hour) |
| *B1 | 3 | 0.8 | 3.0 | 50 | 5 | 100 | 1200 | 80 | 72 | — | — | — |
| B2 | 3 | 0.7 | 3.0 | 50 | 6 | 400 | 1270 | 0 | 71 | 16600 | 3.6 | 15 |
| B3 | 3 | 0.7 | 3.0 | 180 | 5 | 100 | 1200 | 0 | 80 | 17400 | 4.6 | 45 |
| B4 | 3 | 0.4 | 3.0 | 100 | 5 | 100 | 1200 | 0 | 88 | 18200 | 4.6 | 53 |
| B5 | 3 | 0.2 | 2.0 | 15 | 5 | 100 | 1170 | 0 | 92 | 16700 | 3.7 | 64 |
| B6 | 3 | 0.2 | 2.0 | 250 | 5 | 100 | 1200 | 0 | 73 | 15400 | 3.5 | 27 |
| *B7 | 3 | 0.1 | 1.5 | 50 | 5 | 100 | 1200 | 75 | 88 | — | — | — |
| *B8 | 1 | 0.8 | 1.0 | 50 | 5 | 100 | 1200 | 76 | 93 | — | — | — |
| B9 | 1 | 0.7 | 1.0 | 250 | 5 | 100 | 1200 | 0 | 65 | 13600 | 3.6 | 23 |
| B10 | 1 | 0.7 | 1.0 | 100 | 5 | 100 | 1200 | 0 | 87 | 13300 | 4.6 | 33 |
| B11 | 1 | 0.4 | 1.0 | 50 | 5 | 100 | 1200 | 0 | 95 | 14100 | 4.5 | 56 |
| B12 | 1 | 0.2 | 1.0 | 15 | 5 | 100 | 1200 | 0 | 94 | 13700 | 4.3 | 61 |
| B13 | 1 | 0.2 | 1.0 | 5 | 5 | 100 | 1170 | 10 | 63 | 9280 | 3.1 | 35 |
| *B14 | 1 | 0.2 | 0.4 | 50 | 5 | 100 | 1100 | 0 | 96 | 5700 | 2.3 | 2 |
| *B15 | 1 | 0.1 | 1.0 | 50 | 5 | 100 | 1170 | 85 | 93 | — | — | — |

As shown in Table 7, with respect to the asterisked sample Nos. B1 and B8, the thickness of the internal electrodes was 0.8 μm and delamination occurred at a high rate. With respect to the asterisked sample Nos. B7 and B15, the thickness of the internal electrodes was 0.1 μm and delamination also occurred at a high rate. With respect to the asterisked sample No. B14, the average particle diameter of grains of the ceramic layers was 0.5 μm or less, the dielectric constant was low and reliability was decreased.

In contrast, with respect to the sample Nos. B2 to B6 and B9 to B13, in which the thickness of the internal electrodes was in the range from about 0.2 to 0.7 μm, delamination did not occur or did not substantially occur. With respect to the sample No. B2, the average particle diameter of the ceramic raw material powder exceeded 250 nm and reliability was slightly inferior among those mentioned above. In the sample Nos. B6 and B9, the average particle diameter of the Ni powder exceeded 200 nm, and the coverage was decreased. In the sample No. B13, the average particle diameter of the nickel powder was less than 10 nm, the coverage was decreased and delamination occurred slightly.

As is obvious from the results described above, in example 2, the same as in example 1, when the ceramic layers have a thickness of about 3 μm or less, if the internal electrodes have a thickness of about 0.2 to 0.7 μm, the average particle diameter of ceramic grains exceeds about 0.5 μm, and the particle diameter of ceramic grains in the thickness direction of the ceramic layers is smaller than the thickness of the ceramic layers, delamination is prevented and superior electrical characteristics are exhibited.

Furthermore, the ceramic grains constituting the ceramic layers of the monolithic ceramic capacitors were observed by transmission electron microscopy, and analysis was carried out. The ceramic constituting the ceramic layers was pulverized and X-ray powder diffraction analysis was carried out. The resultant diffraction patterns were analyzed by the Rietveld method and the crystalline phase was identified. As a result, it was confirmed that each of the ceramic grains had a uniform composition and a uniform crystal system, and the individual ceramic grains had the same composition and the same crystal system.

EXAMPLE 3

First, as ceramic raw material powders, the (Ca, Sr)(Ti, Zr)$O_3$-based raw material composition shown in Table 8 was prepared by a solid-phase method. That is, $CaCO_3$, $SrCo_3$, $TiO_2$, $ZERO_2$ and $MnO_2$ were prepared, and wet mixing and milling were performed by a ball mill using zirconia balls, followed by drying. The dried raw material was calcined at 1,000° C. and 1,200° C., and raw material powders having average particle diameters of 150 nm and 500 nm shown in Table 9 were prepared.

TABLE 8

| (Ca, Sr)(Ti, Zr)$O_3$ + 1.3 mol % $MnO_2$ | |
|---|---|
| Component | Molar Ratio |
| Ca | 0.6 |
| Sr | 0.4 |
| Ti | 0.3 |
| Zr | 0.7 |

TABLE 9

| Raw Material No. | Calcining Temperature (° C.) | Average Particle Diameter D50 (nm) |
|---|---|---|
| 7 | 1000 | 150 |
| 8 | 1200 | 500 |

Next, in a manner similar to that in example 1, ceramic green sheets having thicknesses of 4.2 μm and 1.4 μm were formed. The individual thicknesses of 4.2 μm and 1.4 μm corresponded to the thicknesses of 3 μm and 1 μm of the ceramic layers after firing, respectively.

Ni pastes were then produced in a manner similar to that in example 1, and the resultant Ni pastes were screen-printed on the ceramic green sheets to form conductive paste films with thicknesses of 1.2 µm, 1.0 µm, 0.6 µm, 0.3 µm and 0.15 µm. The individual thicknesses of 1.2 µm, 1.0 µm, 0.6 µm, 0.3 µm and 0.15 µm corresponded to the individual thicknesses of 0.8 µm, 0.7 µm, 0.4 µm, 0.2 µm and 0.1 µm of the internal electrodes after firing.

Next, in a manner similar to that in example 1, monolithic ceramic capacitors were fabricated and evaluated. The results thereof are shown in Table 10. The asterisked sample numbers in Table 10 indicate that the samples were out of the scope of the present invention.

ried out. The ceramic constituting the ceramic layers was pulverized and X-ray powder diffraction analysis was carried out. The resultant diffraction patterns were analyzed by the Rietveld method and the crystalline phase was identified. As a result, it was confirmed that each of the ceramic grains had a uniform composition and a uniform crystal system, and the ceramic layers were composed of at least 2 types of ceramic grains having different compositions.

As described above, in accordance with the present invention, since the internal electrodes have a thickness of about 0.2 to 0.7 µm, even if the thickness of the ceramic

TABLE 10

| | Monolithic Ceramic Capacitor | | | Material Characteristics | | | | Evaluation of Laminated Structure | | Evaluation of Electrical Characteristics | | |
|---|---|---|---|---|---|---|---|---|---|---|---|---|
| | | | Grain | Ni | Ceramic Raw Material Powder | | Monolithic | | | | | |
| | | | Average | Average | | Average | Capacitor | | | | | Average |
| Sample No. | Device Thickness (µm) | Electrode Thickness (µm) | Particle Diameter (µm) | Particle Diameter (nm) | Raw Material No. | Particle Diameter (nm) | Firing Temperature (° C.) | Delamination (%) | Coverage (%) | ε | tan δ (%) | Life (hour) |
| *C1 | 3 | 0.8 | 1.0 | 50 | 7 | 150 | 1250 | 93 | 91 | — | — | — |
| *C2 | 3 | 0.7 | 0.3 | 50 | 7 | 150 | 1170 | 0 | 95 | 22 | 800 | 3 |
| C3 | 3 | 0.7 | 1.5 | 50 | 8 | 500 | 1270 | 0 | 86 | 26 | >5000 | 95 |
| C4 | 3 | 0.7 | 1.0 | 180 | 7 | 150 | 1250 | 0 | 82 | 27 | >5000 | 132 |
| C5 | 3 | 0.4 | 1.0 | 100 | 7 | 150 | 1250 | 0 | 85 | 27 | >5000 | 133 |
| C6 | 3 | 0.2 | 1.0 | 15 | 7 | 150 | 1250 | 0 | 83 | 28 | >5000 | 145 |
| C7 | 3 | 0.2 | 1.0 | 50 | 7 | 150 | 1250 | 0 | 72 | 27 | — | 156 |
| *C8 | 3 | 0.1 | 1.0 | 50 | 7 | 150 | 1250 | 84 | 58 | — | — | — |
| *C9 | 1 | 0.8 | 1.0 | 50 | 7 | 150 | 1250 | 81 | 90 | — | >5000 | — |
| C10 | 1 | 0.7 | 1.0 | 15 | 7 | 150 | 1250 | 0 | 63 | 27 | >5000 | 103 |
| C11 | 1 | 0.4 | 1.0 | 50 | 7 | 150 | 1250 | 0 | 89 | 28 | >5000 | 126 |
| C12 | 1 | 0.2 | 1.0 | 15 | 7 | 150 | 1250 | 0 | 91 | 26 | >5000 | 147 |
| *C13 | 1 | 0.1 | 1.0 | 50 | 7 | 150 | 1250 | 95 | 88 | — | — | — |

As shown in Table 10, with respect to the asterisked sample Nos. C1 and C9, the thickness of the internal electrodes was 0.8 µm, and delamination occurred at a high rate. With respect to the asterisked sample Nos. C8 and C13, the thickness of the internal electrodes was 0.1 µm and delamination also occurred at a high rate. With respect to the asterisked sample No. C2, the average particle diameter of grains of the ceramic layers was 0.5 µm or less, the dielectric constant and the Q factor were low and reliability was decreased.

In contrast, with respect to the sample Nos. C3 to C7 and C10 to C12, in which the thickness of the internal electrodes was in the range from about 0.2 to 0.7 µm, delamination did not occur. However, in the sample No. C3, the average particle diameter of the ceramic raw material powder exceeded 250 nm and reliability was slightly inferior among those mentioned above.

As is obvious from the results described above, in example 3, the same as in example 1, when the ceramic layers have a thickness of about 3 µm or less, if the internal electrodes have a thickness of about 0.2 to 0.7 µm, the average particle diameter of ceramic grains exceeds about 0.5 µm, and the particle diameter of ceramic grains in the thickness direction of the ceramic layers is smaller than the thickness of the ceramic layers, delamination is prevented and superior electrical characteristics are exhibited.

Furthermore, the ceramic grains constituting the ceramic layers of the monolithic ceramic capacitors were observed by transmission electron microscopy, and analysis was carlayers is decreased to about 3 µm or less, delamination in the monolithic ceramic electronic component can be prevented from occurring. Consequently, the present invention is effectively applicable to a monolithic ceramic capacitor in view of miniaturization and an increase in capacitance of the monolithic ceramic capacitor.

Since ceramic grains constituting the ceramic layers have an average particle diameter of more than about 0.5 µm and the particle diameter of the ceramic grains in the thickness direction of the ceramic layers is smaller than the thickness of the ceramic layers, required dielectric properties can be secured even if the thickness of the ceramic layers is decreased to about 3 µm or less.

In the present invention, if a paste containing a metallic paste is used for forming the internal electrodes and the metallic powder has an average particle diameter of about 10 to 200 nm, the packing density and evenness of the metallic powder in the internal electrodes improve. Thereby, even in the internal electrodes having a thickness as small as about 0.2 to 0.7 µm, it is possible to achieve coverage that can provide satisfactory electrical characteristics, such as the dielectric properties of the ceramic constituting the ceramic layers, and the function as the internal electrodes can be fully achieved. Since a printing method, such as screen-printing, can be employed without any problems to form the internal electrodes, the step of forming the internal electrodes can be performed efficiently.

As the metallic powder, if a powder composed of a base metal is used, the material cost can be reduced, and if a metal containing nickel is used as the base metal, higher oxidation resistance can be expected in comparison with copper, etc.

If the ceramic raw material powder having an average particle diameter of about 25 to 250 nm is used, since the packing density and the evenness of the ceramic layers are improved, high reliability can be achieved even in the ceramic layers which are as thin as about 3 $\mu$m or less.

As described above, by properly combining the average particle diameter of the metallic powder, the thickness of the internal electrodes, the average particle diameter of the ceramic raw material powder, the average particle diameter of ceramic grains and the thickness of the ceramic layers, thin-film multilayered monolithic ceramic electronic components, in particular, small monolithic ceramic capacitors having large capacitance, can be fabricated.

With respect to ceramic grains constituting the ceramic layers, if each of the ceramic grains has a uniform composition and a uniform crystal system, and the ceramic layers are composed of one type of ceramic grains having the same composition and the same crystal system or are composed of at least 2 types of ceramic grains having different compositions, monolithic ceramic electronic components having superior electrical characteristics and high reliability can be fabricated.

What is claimed is:

1. A monolithic ceramic electronic component comprising:
    a laminate comprising a plurality of sintered ceramic layers and a plurality of internal sintered metallic electrodes located between adjacent ceramic layers,
    wherein the ceramic layers have a thickness of about 3 $\mu$m or less and comprise ceramic grains having an average particle diameter of more than about 0.5 $\mu$m, the particle diameter of the ceramic grains in the thickness direction of the ceramic layers being smaller than the thickness of each of the ceramic layers, and wherein each of the internal electrodes has a thickness of about 0.2 to 0.7 $\mu$m.

2. A monolithic ceramic electronic component according to claim 1, further comprising an external electrode on each of two opposing ends of the laminate, wherein the ceramic layers comprise a ceramic dielectric material, and each of the plurality of internal electrodes is electrically connected to one of the external electrodes to form a monolithic ceramic capacitor.

3. A monolithic ceramic electronic component according to claim 2, wherein the ceramic dielectric material comprises a barium titanate.

4. A monolithic ceramic electronic component according to claim 2, wherein the internal electrodes are of a sintered metallic powder which has an average particle diameter of about 10 to 200 nm.

5. A monolithic ceramic electronic component according to claim 4, wherein the metallic powder comprises a base metal.

6. A monolithic ceramic electronic component according to claim 5, wherein the base metal comprises nickel.

7. A monolithic ceramic electronic component according to claim 1, wherein the internal electrodes comprise a sintered metallic powder.

8. A monolithic ceramic electronic component according to claim 1, wherein the ceramic grains before sintering has an average particle diameter of about 25 to 250 nm.

9. A monolithic ceramic electronic component according to claim 8, wherein each of the ceramic grains constituting the ceramic layers has a uniform composition and a uniform crystal system, and the individual ceramic grains have the same composition and the same crystal system.

10. A monolithic ceramic electronic component according to claim 8, wherein each of the ceramic grains constituting the ceramic layers has a uniform composition and a uniform crystal system, and the ceramic layers comprise at least 2 types of ceramic grains having different compositions.

11. A monolithic ceramic electronic component according to claim 1, wherein the internal electrodes are of a sintered metallic powder which has an average particle diameter of about 10 to 200 nm.

12. A monolithic ceramic electronic component according to claim 11, wherein the metallic powder comprises a base metal.

13. A monolithic ceramic electronic component according to claim 12, wherein the base metal comprises nickel.

14. A monolithic ceramic electronic component according to claim 1, wherein the metallic electrodes comprise a base metal.

15. A monolithic ceramic electronic component according to claim 14, wherein the base metal comprises nickel.

16. A monolithic ceramic electronic component according to claim 1, wherein each of the ceramic grains constituting the ceramic layers has a uniform composition and a uniform crystal system, and the individual ceramic grains have the same composition and the same crystal system.

17. A monolithic ceramic electronic component according to claim 1, wherein each of the ceramic grains constituting the ceramic layers has a uniform composition and a uniform crystal system, and the ceramic layers comprise at least 2 types of ceramic grains having different compositions.

* * * * *